United States Patent
Preston et al.

(10) Patent No.: US 11,059,073 B1
(45) Date of Patent: Jul. 13, 2021

(54) COMMINGLING PHYSICAL TRAY BOUNDARIES

(71) Applicant: Broadridge Output Solutions, Inc., Jersey City, NJ (US)

(72) Inventors: Charles Preston, Orangevale, CA (US); Marc Fagan, Folsom, CA (US)

(73) Assignee: Broadridge Output Solutions, Inc., Jersey City, NJ (US)

(*) Notice: Subject to any disclaimer, the term of this patent is extended or adjusted under 35 U.S.C. 154(b) by 259 days.

(21) Appl. No.: 15/662,690

(22) Filed: Jul. 28, 2017

Related U.S. Application Data

(63) Continuation-in-part of application No. 14/228,517, filed on Mar. 28, 2014, now abandoned.

(60) Provisional application No. 61/806,314, filed on Mar. 28, 2013.

(51) Int. Cl.
  *B07C 3/02* (2006.01)
  *B07C 3/18* (2006.01)
  *G06K 7/14* (2006.01)

(52) U.S. Cl.
  CPC ............... *B07C 3/18* (2013.01); *B07C 3/02* (2013.01); *G06K 7/1413* (2013.01)

(58) Field of Classification Search
  CPC ............ B07C 3/02; B07C 3/18; G06K 7/1413
  See application file for complete search history.

(56) References Cited

U.S. PATENT DOCUMENTS

| 6,279,750 B1* | 8/2001 | Lohmann | B07C 3/02 |
| | | | 209/547 |
| 2006/0108266 A1* | 5/2006 | Bowers | B07C 3/00 |
| | | | 209/584 |
| 2009/0319324 A1* | 12/2009 | Lee | G06Q 10/0631 |
| | | | 705/7.12 |
| 2010/0106290 A1* | 4/2010 | Isles | B07C 3/20 |
| | | | 700/227 |
| 2011/0155544 A1* | 6/2011 | Chastain | B07C 5/36 |
| | | | 198/890.1 |
| 2013/0144429 A1* | 6/2013 | Ragusa | B07C 3/00 |
| | | | 700/224 |

OTHER PUBLICATIONS

Baxter, Vern K. "The Mechanization of Mail Processing." Labor and Politics in the US Postal Service. Springer, Boston, MA, 1994. 119-143. (Year: 1994).*

* cited by examiner

*Primary Examiner* — Scott M Tungate
(74) *Attorney, Agent, or Firm* — Greenberg Traurig, LLP

(57) ABSTRACT

A mail piece sortation system for maximizing a number of INTELLIGENT MAIL BARCODES (IMBs) encoded mail pieces that are postal-allowable within a mailing tray is described. The system utilizes the thickness of each mail piece, which is determined before placement of the mail piece into a mailing tray. A computer controller oversees the operation of the system and tracks the thickness of each mail piece for assembling each mailing tray with a maximum number of mail pieces based on the thickness determination to achieve a maximum allowable number of mail pieces within the mail tray. INTELLIGENT MAIL TRAY LABELS (IMTLs) are created by the system and attached by an operator to each mailing tray.

4 Claims, 4 Drawing Sheets

COMMINGLING PHYSICAL TRAY BOUNDARIES

CROSS-REFERENCE TO RELATED APPLICATIONS

This application is a continuation-in-part of copending application Ser. No. 14/228,517 filed on Mar. 28, 2014. This application claims priority from U.S. provisional application Ser. No. 61/806,314 filed on Mar. 28, 2013.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The subject invention pertains generally to a computer controlled rapid mailing tray assembly system that determines the thicknesses of mail pieces that will be placed within a mailing tray and utilizes this information to maximize, in a virtual plan before actual assembly, the number of mail pieces that will fit within a mailing tray, thereby commingling the physical mailing tray boundaries.

2. Description of Related Art

In mailing letters, the USPS (United States Postal Service) will provide postage rate discounts on trays of mail that are all going to the same zip code. Common discounts are for mail that goes to the same 5 digit zip (for example 95762) or mail that goes to the same 3 digit zip (for example 957XX). One of the ways of obtaining these discounts on mail that is not already sorted to these levels is to utilize commingling equipment to sort these mail pieces to the common discount levels.

Recent requirements from the USPS in order to obtain even more postage discounts for "automated mail" are for mailers to utilize the USPS "One Code solutions." These One Code solutions are comprised of the INTELLIGENT MAIL BARCODE or IMB (herein referred to as an "information containing barcode" or ICB), INTELLIGENT MAIL TRAY LABEL or IMTL (herein referred to as a "printed information mail tray label" or PIMTL), and INTELLIGENT MAIL CONTAINER LABEL or IMCL (herein referred to as a "printed information mail container label" or PIMCL). The IMB/ICB is a barcode printed near the address on a mail piece (see an example in FIG. 1). This barcode allows the USPS to track mail in its system. IMTLs/PIMTLs and IMCLs/PIMCLs are trays containing a special barcode label that has IMTL/PIMTL bearing mail contained therein, and also allows the USPS to track these trays and consequently the mail pieces that are contained in the trays and pallets or containers of mail trays.

This presents a challenge to automated mail producers. Currently, the mail pieces and the IMTL/PIMTL data for the mail pieces in a mail tray must be sent to the USPS for tracking purposes prior to or immediately after mailing. One way of knowing which mail pieces are in any particular tray is to "virtually" produce the tray prior to physical production. A system such as this is described in U.S. Pat. No. 5,264,665 "Postal processing system" (Delfer), wherein the system tracks and knows which mail pieces are going to be in any particular tray. For automated mail producers that utilize commingling equipment to sort the mail pieces into zip code level separations, the process is difficult and the existing equipment for commingling is not currently capable of identifying what pieces of mail will go into a mail tray. Consequently, the IMTL/PIMTL and IMB/ICB data is not easily provided to the USPS.

Isles et al. (U.S. P.G. Pub. 2010/0106290 A1) discloses means for a mail piece sortation system that correlates individual mail pieces with particular containers, but only for the case where containers are produced serially, i.e. one at a time.

Lee et al. (U.S. P.G. Pub. 2009/0319324 A1) discloses means for a mail piece sortation system that produces containers in parallel, but absent means for correlating individual mail pieces with particular containers.

Combining Isles with Lee would satisfy the need for both parallel production and mail piece-container correlation, but such a solution would be cumbersome because every sort destination would need the marking system of Isles.

The disclosed invention satisfies this need in a novel way that provides a practical solution in a much more economical way even in the case of hundreds of sort destinations.

BRIEF SUMMARY OF THE INVENTION

An object of the present invention is to provide a mail piece sortation system for maximizing the number of mail pieces that are postal-allowable with a mailing tray.

Another object of the present invention is to furnish a mail piece sortation system for maximizing a number of mail pieces that are allowed by United States Postal Service (USPS) regulations within a mailing tray, wherein all of the mailing pieces are going to the same zip code.

A further object of the present invention is to supply a mail piece sortation system for maximizing a number of mail pieces that are allowed by USPS regulations within a mailing tray, wherein all of the mailing pieces are going to the same zip code, based on a establishing a virtual total thickness for all individual mail pieces within a mailing tray before physically assembling the mailing tray with the mail pieces.

Still another object of the present invention is to disclose a mail piece sortation system for maximizing a number of mail pieces that are allowed by USPS regulations within a mailing tray based on a establishing a virtual total thickness for all individual mail pieces within a mailing tray before physically assembling the mailing tray with the mail pieces.

Yet a further object of the present invention is to describe a mail piece sortation system for maximizing a number of mail pieces that are allowed by USPS regulations within a mailing tray, wherein all of the mailing pieces are going to the same zip code, based on a establishing a virtual total thickness for all individual mail pieces within a mailing tray before physically assembling the mailing tray with the mail pieces and sending mailing information to the USPS for tracking and mailing discount purposes.

Yet a further object of the present invention is to describe a mail piece sortation system for maximizing a number of mail pieces that are allowed by USPS regulations within a mailing tray, wherein all of the mailing pieces are going to the same zip code, based on and establishing a virtual total thickness for all individual mail pieces within a mailing tray before physically assembling the mailing tray with the mail pieces, while allowing hundreds of such trays to be under construction simultaneously through the use of multi-channel containerization, and sending mailing information to the USPS for tracking and mailing discount purposes.

Disclosed is a mail piece sortation system for maximizing a number of mail pieces that are allowable, under applicable postal requirements, within a mailing tray. The subject invention comprises a storing and utilizing mechanism that is configured to store and utilize an IMB/ICB for each mail piece being sorted, wherein the IMB/ICB contains a thickness determination for each mail piece being handled by the system before placement of the mail piece into a mailing tray, an overseeing computer control mechanism that is configured to oversee the operation of the sortation system and tracking the thickness of each mail piece via the stored IMB/ICB information, an assembly mechanism that is configured to assemble each mailing tray with a maximum number of mail pieces based on the stored thickness information to achieve a maximum allowable number of mail pieces within each mail tray, and a printer configured to create/print an IMTL/PIMTL for each mailing tray. Following attachment of the IMTL/PIMTL to each mailing tray, IMCLs/PIMCLs are generated and attached to a container of mailing trays.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only.

DETAILED DESCRIPTION OF THE INVENTION

Figure 1A:
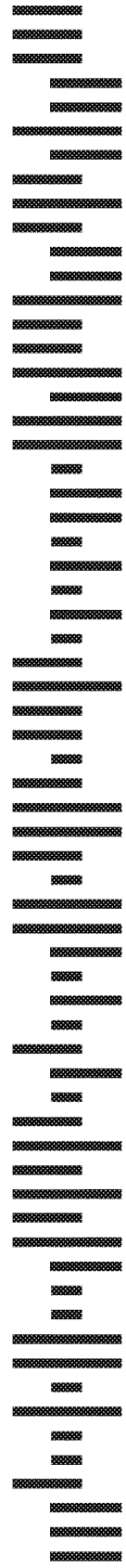
FIG. 1A—PRIOR ART—is a photo of a standard IMB/ICB marking that carries information and is employed in the subject mail piece sorting system.

For the subject invention, the implementing mailing facility knows, from processing individual mailing piece data that is collected and stored in appropriate files, the weight and thickness of each mail piece before it is manufactured. Along with other relevant mail piece information, the weight and thickness information is stored and printed on each mail piece in the form of an IMB/ICB marking. Once manufactured, the mailing facility is able to scan each mail piece on the utilized commingling equipment, decode the IMB/ICB markings to ascertain which mail piece is being sorted, and then look up the thickness of the mail piece. The mailing facility knows, based on the established thicknesses of the mail pieces, how many mail pieces will fit into a mail tray according to USPS regulations, since the mailing facility also knows exactly what destination bin on the subject commingling equipment the mail piece will be sent (each destination bin corresponds to a zip code or partial zip code region). When the mailing facility has calculated that a tray full of mail exists in a sortation bin on the subject commingling machine, an operator is signaled to empty the bin into a mailing tray and to print and attach a mail tray IMTL/PIMTL onto the tray.

The mailing facility now has the capability to produce an IMTL/PIMTL and associate the mail contained therein with the tray identification contained in the IMTL/PIMTL. This data is captured and then sent to the USPS for tracking purposes, and the mailing facility is able to claim the additional postage discounts associated with the One Code discount rate.

Any suitable thickness determination mechanism configured to identify mail piece thicknesses is considered to be within the realm of this invention (each thickness is computer-stored for later use). One exemplary, although not limiting, thickness determining mechanism is configured to associate thickness of mail pieces by passing each mail piece between rollers, with one roller fixed and another on a swivel or moveable spring loaded mount. The amount of displacement of the moveable roller can be determined electronically and thereby calculate the mail piece thickness. This data can then be associated with the mail piece by reading the mail piece IMB/ICB on the commingling equipment, and follow the remainder of the tray loading process for eventually signaling the operator to empty the sortation bin into the mail tray and creating and applying an IMTL/PIMTL to each mailing tray.

Yet another way of identifying the thickness of the mail pieces is by determining the position of the sort bin accumulation plate. When the plate has reached the amount of space available in a mail tray, the operator is signaled to empty the sortation bin into the mail tray and creating and applying an IMTL/PIMTL to the mailing tray. The data associated with the mail pieces in the bin are then linked to the IMTL/PIMTL data.

Functional Description: The function required is to produce unique, postal compliant tray labels (IMTL/PIMTL) for each mailing tray that leaves the commingling area. In addition, for each IMTL/PIMTL, the mailing facility must report to the postal service the unique mail piece ID (IMB/ICB) for each mail piece in that tray.

Figure 1B:
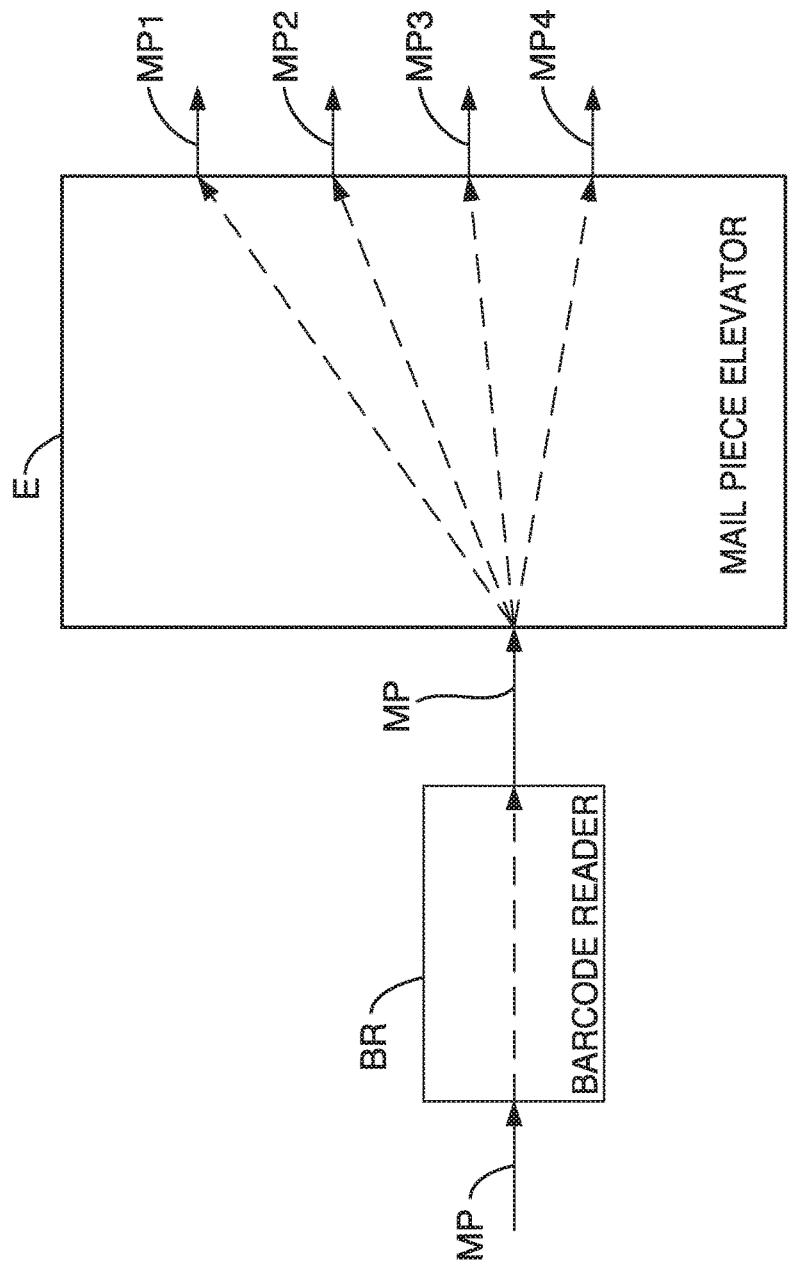
FIG. 1B—PRIOR ART—is a block diagram showing a mail piece stream, with each mail piece having an IMB/ICB marking, passing through an IMB/ICB reader and onto a standard mail piece elevator that splits the mail piece stream into four level of outgoing streams of mail pieces that will then enter the subject invention at its four level of trays.

Starting a Job: Mailing pieces are delivered to the sortation area of the mailing facility. As seen in FIG. 1B, a stream of mailing pieces MP are moved, often by mean of a standard conveyor belt system, past a barcode reader BR that identifies each mail piece's IMB/ICB from stored information about the mail pieces. The MP stream then travels into an apparatus the is often termed a "mail piece elevator" E that divides the entering mail piece stream into multiple streams MP1, MP2, MP3, and MP4 that exit at different elevations by conveyor belt transfer lines. It is stressed that the exact position of each mail piece in the MP1, MP2, MP3, and MP4 streams is known by the controlling computer due to the scanned barcodes upon entry. These pieces of equipment (transport mechanisms, barcode scanner, and mail piece elevator) exist and may be purchased from several companies such as: the "Maxim" from the NPI Company, Fort Worth, Tex.

Figure 2:
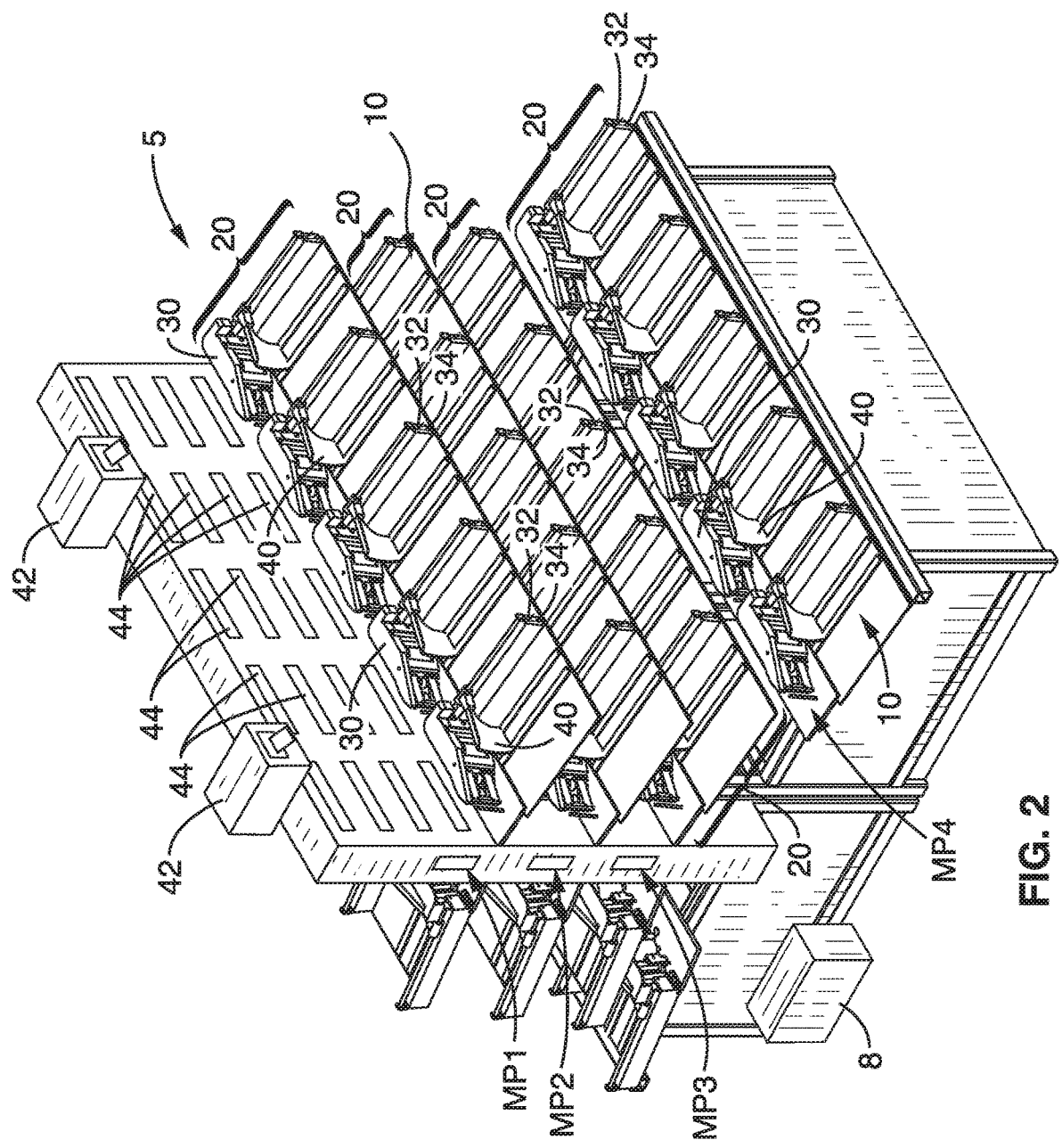
FIG. 2 is a perspective view of an exemplary set of sort bins and accumulation plates that are utilized in the subject mail piece sorting system.

Typically, though not limiting, there are 480 bins 10 on each of the mail sorters (see FIG. 2 for an exemplary mail sorter). Specifically, as seen in FIG. 2, the typical mail sorter 5, utilizes a computer controller 8 that controls the operation of the sorter 5 and contains the previously read mail stream IMBs/ICBs and multiple sort bins 10 arranged in multiple layers 20 (each mail piece stream MP1, MP2, MP3, and MP4 enter into the sorter at a different layer—top to bottom, in the exemplary case). Each sort bin 10 has an envelope diverter 30 and an envelope stop/rail guide 40. Further, each bin 10 has an associated status lamp 32 and printing button 34. There are also several IMTL/PIMTL printers 42 associated with each sorter and a visual mail piece count display 44 for each bin 10.

At the beginning of a job, all 480 lamps 32 are off, mail pieces begin to accumulate in bins 10, via the mail streams MP1, MP2, MP3, and MP4, and sweepers (workers operating the system) move mail pieces from full bins 10 to mailing containers/trays (not shown) that correspond to each bin 10. When the first mail piece for a new mailing container is assigned to a bin 10, the lamp 32 at that bin 10 is turned on, and the bin display 44 changes from normal mode to "Leave Behind Piece Count" mode. This indicates to the operator/sweeper that a new mailing container/tray has been started and that an IMTL/PIMTL may now be printed for that bin 10 when full. The operator/sweeper must then press the button 34 associated with that bin 10 to print that IMTL/PIMTL. In all cases, if the button 34 is pressed while the lamp 32 is off, a dummy test label will be printed.

After the First Piece: As mail pieces continue to arrive at a bin 10, they are removed by the operator to the mailing container/tray. The controlling computer 8 software uses the known thickness of the mail pieces to calculate when a tray is full, and if a tray fills up before its IMTL/PIMTL is printed, no further mail pieces will be routed to that bin 10. Once the IMTL/PIMTL has been printed, the lamp 32 is turned off until the first mail piece of the next mailing tray arrives. When sweeping a bin 10 with its lamp 32 on, the operator will always leave behind the number of pieces called out by the bin display 44 for the next mailing tray. The process then repeats.

The carefully orchestrated manner in which the operator interacts with the lamps 32, buttons 34, bin displays 44, and tag (IMTL/PIMTL) printers 42, which are all connected to and/or controlled by the invention's computer controls 8, allows an individual operator to successfully correlate individual mail pieces and corresponding tags to particular mailing containers even though hundreds are under construction at any given time and mail pieces are being processed at a rate of 40,000 per hour.

One reason the subject system works so well is that the computer controller 8 keeps track of how many pieces have been delivered to each bin 10 since that bin's lamp 32 was turned on, and displays that number in the bin display 44 corresponding to that bin 10. The average rate at which mail pieces are delivered to bins 10 is only 2-3 per minute; so an operator needn't rush every time a lamp 32 goes on. Instead, whenever an unhurried operator reaches a bin 10 whose lamp 32 is on, a quick glance at the bin display 44 corresponding to that bin 10 tells the operator how many pieces, at the back of the bin 10, to leave behind for the next mailing container. The operator then just sweeps all the other mail pieces, those nearest the operator, into the corresponding mailing container, which, at that moment, has no tag.

At this moment, the number of mail pieces in the bin equals the number shown on the bin display 44; the lamp 32 is still on; and the just-filled mailing container has no tag.

This is the point at which the operator presses the button 34 adjacent to the illuminated lamp 32, which triggers the computer controller 8 to cause three things to happen simultaneously: 1) the lamp 32 goes out; 2) the bin display 44 changes back to normal mode, and 3) the tag printer 42 nearest that bin, which is the one and only tag printer 42 within arm's reach of the button 34 that was pressed, produces a tag (IMTL/PIMTL) with a unique identity that is permanently correlated with the mail pieces in the corresponding container. The operator simply tears off the tag (IMTL/PIMTL), attaches it to the container, and drops the completed container onto the exit conveyor for mailing.

By the subject technology, operators can reliably produce many hundreds of containers of mail in an ordinary shift, with each of hundreds of thousands of individual mail pieces being positively correlated against one and only one container, per USPS regulations.

Remaking an IMTL/PIMTL: The control software tracks the IMTL/PIMTL and its associated IMBs/ICBs. To remake the IMTL/PIMTL for a completed tray, the operator scans the IMB/ICB on any mail piece from the tray. The software uses this ID find the associated tray and reprints the original IMTL/PIMTL.

Figure 3A:
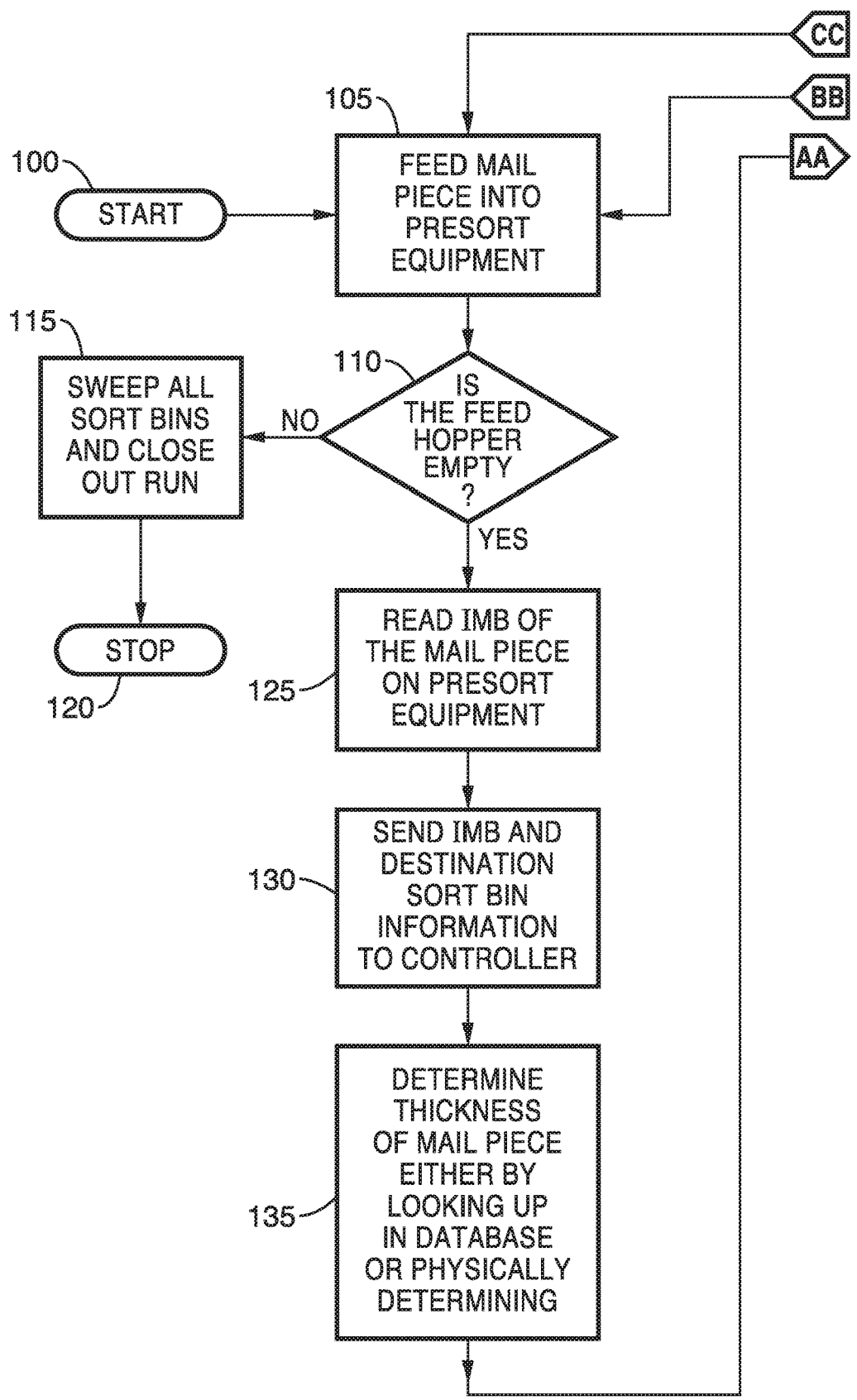
FIG. 3A is the upper portion of a flow diagram illustrating the subject mail piece sorting system.
Figure 3B:
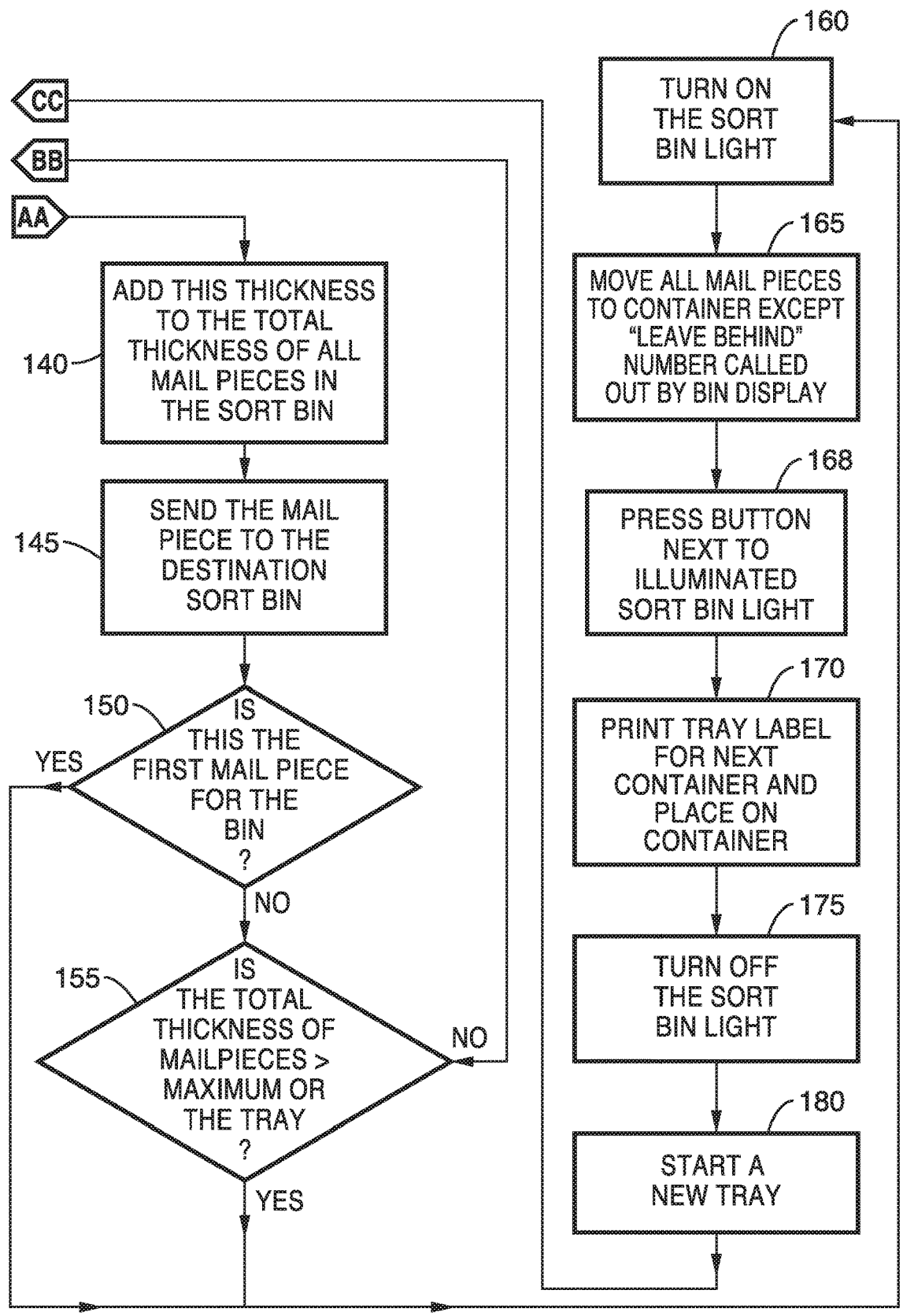
FIG. 3B is the lower portion of a flow diagram illustrating the subject mail piece sorting system.

FIGS. 3A and 3B show a flow diagram that assists in accomplishing the subject process. The process starts 100 by feeding a mail piece into presort equipment 105 and a verification is requested as to whether or not the feed hopper is empty 110. If the feed hopper is not empty then all sort binds are swept and the run closed out 115 with the subject process terminating 120. If the feed hopper is empty then the IMB/ICB of the mail pieces on the presort equipment is read 125. The IMB/ICB and destination sort bin information is then sent to the controller 130 and the thickness determined of each mail piece either by looking up in the appropriate database or physically determining 135. The thickness of each mail piece is added to the total thickness of all of the mail pieces in the sort bin 140. The mail piece is then sent to the destination sort bin 145 and the question is asked "Is this the first mail piece for the bin?" 150. If this question is answered in the affirmative the sort bin light is turned on 160 and if in the negative the program then establishes if the total thickness of the mail pieces exceeds the maximum for that tray 155. If the total thickness in not exceeded then the system cycles back to feeding another mail piece into the presort equipment 105. If the sort bin light is on due to the first mail piece question or the tray total thickness exceeding the maximum for the tray, all of the mail pieces, except the leave behind number called out by the bin display, are removed from the sort bin and put into the mailing tray 165. The operator then presses the button next to the illuminated sort bin light 168. The mailing tray label is printed for the next container and placed on the container 170 and the sort bin light is turned off 175. A new tray in then started 180 and the system cycles back to the step for feeding a mail piece into the presort equipment 105. Once the feed hopper is empty 110 all of the sort bins are swept and the run is closed out 115, thereby stopping the process 120 until the next job.

Embodiments of the subject invention include, but are not limited to, a mail piece sortation system for maximizing a number of mail pieces that is allowable, under applicable postal requirements, within a mailing tray. Comprising the subject invention are suitably configured mechanisms for reading, storing, and utilizing an information containing barcode (ICB) printed on each mail piece being sorted, wherein the ICB contains a thickness determination for each mail piece being handled by the system before placement of the mail piece into a mailing tray, a mail sorter having a plurality of mail piece collection bins, wherein each said bin receives mail pieces being mailed to a desired location, a computer control configured for overseeing the operation of the sortation system, the sortation assembly, and tracking the thickness of each mail piece via the stored ICB information, an assemble mechanism configured to assembly each mailing tray with a maximum number of mail pieces based on the stored thickness information to achieve a maximum allowable number of mail pieces within each mail tray, a signaling mechanism configured to signal to an operator that the maximum allowable number of mail pieces are within a collection bin and ready to be moved to each mailing tray, and a printing mechanism configured to create a printed information mail tray label (PIMTL) for each mailing tray.

Additionally, the subject sortation may send, if desired, the IMB/ICB, IMTL/PIMTL, and IMCL/PIMCL information to a postal agency for tracking and mailing discount purposes.

Further the subject invention includes a mail piece sortation system for maximizing a number of mail pieces that are allowed by United States Postal Service (USPS) regulations within a mailing tray, wherein all of the mailing pieces are going to the same zip code, based on a establishing a virtual total thickness for all individual mail pieces within a mailing tray before physically assembling the mailing tray with the mail pieces. Comprising the virtual total thickness sortation system are a storing and utilizing mechanism configured for storing and utilizing an IMB/ICB for each mail piece being sorted, wherein the IMB/ICB contains a thickness determination for each mail piece being handled by the system before placement of the mail piece into a mailing tray, a computer control mechanism configured for overseeing the operation of the sortation system and tracking the thickness of each mail piece via the stored IMB/ICB information, an assembly mechanism that is configured for assembling each mailing tray with a maximum number of mail pieces based on the stored thickness information to achieve a maximum allowable number of mail pieces within each mail tray, a signaling mechanism that is configured for signaling to an operator that the maximum allowable number of mail pieces is within each mailing tray, and a printing mechanism that is configured for creating an IMTL/PIMTL for each mailing tray. Further, the virtual thickness sortation system sends mail piece information to, if desired, the USPS for tracking and mailing discount purposes.

The subject mail piece sortation system includes a computer controller/processor; and programming in a non-transitory computer readable medium and executable on the computer processor for performing steps comprising: storing and utilizing an IMB/ICB for each mail piece being sorted, wherein the IMB/ICB contains a thickness determination for each mail piece being handled by the system before placement of the mail piece into a mailing tray, a computer control overseeing the operation of the sortation system and tracking the thickness of each mail piece via the stored IMB/ICB information, assembling each mailing tray with a maximum number of mail pieces based on the stored thickness information to achieve a maximum allowable number of mail pieces within each mail tray, signaling to an operator that the maximum allowable number of mail pieces is within each mailing tray, and creating an IMTL/PIMTL for each mailing tray. As above, the subject sortation system may further comprise the step of sending the IMB/ICB, IMTL/PIMTL, and IMCL/PIMCL information to the USPS for tracking and mailing discount purposes.

An additional embodiment of the subject invention comprises a computer readable non-transitory storage medium for maximizing a number of mail pieces that are allowable, under applicable postal requirements, within a mailing tray, comprising software configured to be run by at least one computer processor for performing steps comprising: storing and utilizing an IMB/ICB for each mail piece being sorted, wherein the IMB/ICB contains a thickness determination for each mail piece being handled by the system before placement of the mail piece into a mailing tray, a computer control overseeing the operation of the sortation system and tracking the thickness of each mail piece via the stored IMB/ICB information, assembling each mailing tray with a maximum number of mail pieces based on the stored thickness information to achieve a maximum allowable number of mail pieces within each mail tray, signaling to an operator that the maximum allowable number of mail pieces is within each mailing tray, and creating an IMTL/PIMTL for each mailing tray. Additionally, the IMB/ICB, IMTL/PIMTL, and IMCL/PIMCL information may be sent, if desired, to the USPS for tracking and mailing discount purposes.

Included in embodiments of the subject invention is a computer implemented method for maximizing a number of mail pieces that are allowable, under applicable postal requirements, within a mailing tray. The subject method, comprises: storing and utilizing an ICB for each mail piece being sorted, wherein the ICB contains a thickness determination for each mail piece being handled by the system before placement of the mail piece into a mailing tray, collecting the mail pieces in a mail sorter having a plurality of mail piece collection bins, wherein each bin receives mail pieces being mailed to a desired location, overseeing by a computer control the operation of the sortation system, mail sorter, and tracking the thickness of each mail piece via the stored ICB information, collecting in each bin a maximum number of mail pieces based on the stored thickness information to achieve a maximum allowable number of mail pieces within each mail tray, signaling to an operator that the maximum allowable number of mail pieces are in a bin and ready to be moved to each mailing tray, and creating a PIMTL for each mailing tray. Further included in the subject computer implemented method is sending, if desired, the ICB and PIMCL information to the USPS for tracking and mailing discount purposes.

Embodiments of the present invention may be described with reference to equations, algorithms, and/or flowchart illustrations of methods according to embodiments of the invention. These methods may be implemented using computer program instructions executable on a computer. These methods may also be implemented as computer program products either separately, or as a component of an apparatus or system. In this regard, each equation, algorithm, or block or step of a flowchart, and combinations thereof, may be implemented by various mechanisms, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create mechanisms that are configured for implementing the functions specified in the equation(s), algorithm(s), and/or flowchart(s).

Accordingly, the equations, algorithms, and/or flowcharts support combinations of mechanisms for performing the specified functions, combinations of steps for performing the specified functions, and computer program instructions, such as embodied in computer-readable program code logic mechanisms, for performing the specified functions. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic mechanisms.

Furthermore, these computer program instructions, such as embodied in computer-readable program code logic, may also be stored in a computer readable memory that can direct a computer or other programmable processing apparatus to function in a particular manner, such that the instructions stored in the computer-readable memory produce an article of manufacture including instruction mechanisms that are configured to implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the equation(s), algorithm(s), and/or block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A mail piece sortation system comprising:
   a plurality of bins;
   a plurality of buttons;
   a plurality of lamps;
      wherein each respective lamp of the plurality of lamps is associated with a respective bin of the plurality of bins in each bin layer and a respective button of the plurality of buttons;
   a printer;
   a bin display that is associated with the respective bin; and
   a computer controller comprising at least one processor and a non-transitory computer readable medium having instructions stored thereon that cause the computer controller to:
      determine that a mail piece to be sorted is a first current mail piece of a plurality of current mail pieces to be directed to the respective bin of the plurality of bins;
         wherein the plurality of current mail pieces is associated with a designated mailing tray;
      cause to turn on a respective lamp associated with the respective bin of the plurality of bins;
      cause to display on the bin display a quantity of a set of leave behind mail pieces to be left behind, by an operator, in the respective bin from a plurality of preceding mail pieces;
      prevent routing any current mail piece of the plurality of current mail pieces to the respective bin when the respective lamp is turned on;
      receive an indication that is indicative of the respective button being activated by the operator; and
      upon a receipt of the indication:
         cause the printer to print a respective printed information mail tray label (PIMTL) for the designated mailing tray and
         instruct a mail piece elevator to route the plurality of current mail pieces to the respective bin; and
      wherein the respective PIMTL comprises identification data associated with the plurality of current mail pieces.

2. The sortation system of claim 1, wherein the PIMTL allows a postal agency to track and apply a mailing discount.

3. A method comprising:
   determining that a mail piece to be sorted is a first current mail piece of a plurality of current mail pieces to be directed to a respective bin of a plurality of bins of a mail sorting equipment;
   wherein the plurality of current mail pieces is associated with a designated mailing tray;
   turning on a respective lamp associated with a respective bin of the plurality of bins of the mail sorting equipment;
   displaying on a bin display of the mail sorting equipment a quantity of a set of leave behind mail pieces to be left behind in the respective bin from a plurality of preceding mail pieces;
   emptying the respective bin from a set of preceding mail pieces;
      wherein the set of preceding mail pieces equals to a difference between the plurality of mail pieces and the set of leave behind mail pieces;

preventing any current mail piece of the plurality of current mail pieces to be routed to the respective bin when the respective lamp is turned on;

activating a respective button associated with the respective lamp associated with the respective bin of the plurality of bins of the mail sorting equipment; and upon a receipt of an indication of an indication if the activating of the respective button:
  instructing a printer to print a respective printed information mail tray label (PIMTL) for the designated mailing tray and
  instructing a mail piece elevator to route the plurality of current mail pieces to the respective bin; and
wherein the respective PIMTL comprises identification data associated with the plurality of current mail pieces.

4. The method of claim 3, wherein the PIMTL allows a postal agency to track and apply a mailing discount.

\* \* \* \* \*